United States Patent
Bae et al.

(10) Patent No.: US 10,762,839 B2
(45) Date of Patent: Sep. 1, 2020

(54) DISPLAY DEVICE AND METHOD FOR CONTROLLING INDEPENDENTLY BY A GROUP OF PIXELS

(71) Applicant: SAMSUNG ELECTRONICS CO., LTD., Suwon-si, Gyeonggi-do (KR)

(72) Inventors: Jong Kon Bae, Suwon-si (KR); Dong Hwy Kim, Suwon-si (KR); Dong Kyoon Han, Suwon-si (KR); Yo Han Lee, Suwon-si (KR); Yun Pyo Hong, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 16/191,856

(22) Filed: Nov. 15, 2018

(65) Prior Publication Data

US 2019/0147800 A1  May 16, 2019

(30) Foreign Application Priority Data

Nov. 15, 2017  (KR) .......................... 10-2017-0151969

(51) Int. Cl.
  *G09G 3/3233* (2016.01)
  *G06F 3/041* (2006.01)
  (Continued)

(52) U.S. Cl.
  CPC ......... *G09G 3/3233* (2013.01); *G09G 3/3291* (2013.01); *G09G 3/3688* (2013.01); *G09G 2310/027* (2013.01); *G09G 2310/0286* (2013.01); *G09G 2310/0291* (2013.01); *G09G 2310/0294* (2013.01); *G09G 2320/0247* (2013.01); *G09G 2320/0252* (2013.01); *G09G 2320/0673* (2013.01); *G09G 2330/021* (2013.01)

(58) Field of Classification Search
  CPC ... G09G 2310/0251; G09G 2310/0286; G09G 2310/0291; G09G 2310/08; G09G 2320/0673; G09G 2330/021; G09G 3/3233; G09G 3/3291
  See application file for complete search history.

(56) References Cited

U.S. PATENT DOCUMENTS 4,107,786 A * 8/1978 Masaki ................ G06K 15/128
  178/30
4,644,319 A * 2/1987 Yamaguchi ............ G06K 15/00
  345/471

(Continued)

FOREIGN PATENT DOCUMENTS

KR  10-0907413  7/2009
KR  10-0934975  1/2010
(Continued)

OTHER PUBLICATIONS

Search Report dated Feb. 21, 2019 in counterpart International Patent Application No. PCT/KR2018/013981.

*Primary Examiner* — Michael J Jansen, II
(74) *Attorney, Agent, or Firm* — Nixon & Vanderhye P.C.

(57) ABSTRACT

A display driver integrated circuit may include a controller configured to receive first image data from an application processor positioned outside the display driver integrated circuit and a data driver configured to receive the first image data from the controller.

19 Claims, 9 Drawing Sheets

(51) Int. Cl.
  *G09G 3/36* (2006.01)
  *G06F 21/44* (2013.01)
  *G09G 3/3291* (2016.01)

(56) References Cited

U.S. PATENT DOCUMENTS

| | | | | |
|---|---|---|---|---|
| 5,192,945 | A * | 3/1993 | Kusada | G09G 3/3607 |
| | | | | 345/100 |
| 6,088,014 | A * | 7/2000 | Furuhashi | G09G 3/3611 |
| | | | | 345/100 |
| 6,222,518 | B1 * | 4/2001 | Ikeda | G09G 3/14 |
| | | | | 345/98 |
| 6,388,653 | B1 * | 5/2002 | Goto | G09G 3/3688 |
| | | | | 345/96 |
| 6,437,768 | B1 * | 8/2002 | Kubota | G09G 3/3688 |
| | | | | 345/100 |
| 6,525,710 | B1 * | 2/2003 | Kwon | G09G 3/3648 |
| | | | | 345/100 |
| 6,731,263 | B2 * | 5/2004 | Goto | G09G 3/3688 |
| | | | | 345/100 |
| 7,049,991 | B2 * | 5/2006 | Kimura | G09G 3/325 |
| | | | | 341/118 |
| 7,142,221 | B2 * | 11/2006 | Sakamaki | G09G 3/3611 |
| | | | | 345/592 |
| 7,176,871 | B2 * | 2/2007 | Yeh | G09G 3/3648 |
| | | | | 345/100 |
| 7,317,461 | B2 * | 1/2008 | Uchida | G09G 3/3666 |
| | | | | 345/690 |
| 7,417,614 | B2 * | 8/2008 | Goto | G09G 3/3688 |
| | | | | 345/96 |
| 7,602,465 | B2 * | 10/2009 | Kim | G02F 1/134363 |
| | | | | 349/141 |
| 7,961,167 | B2 * | 6/2011 | Kida | G09G 3/3688 |
| | | | | 345/98 |
| 7,978,188 | B2 * | 7/2011 | Shin | G09G 3/3291 |
| | | | | 345/204 |
| 8,009,130 | B2 * | 8/2011 | Kim | G09G 3/3648 |
| | | | | 345/210 |
| 8,384,646 | B2 * | 2/2013 | Park | G09G 3/3614 |
| | | | | 345/96 |
| 8,466,868 | B2 | 6/2013 | Lee et al. | |
| 8,508,453 | B2 * | 8/2013 | Nakayama | G09G 3/3688 |
| | | | | 345/100 |
| 8,736,531 | B2 * | 5/2014 | Gondo | G09G 3/3648 |
| | | | | 345/94 |
| 8,896,504 | B2 | 11/2014 | Park et al. | |
| 8,947,412 | B2 * | 2/2015 | Jeon | G09G 3/3611 |
| | | | | 345/204 |
| 9,171,514 | B2 * | 10/2015 | Kim | G09G 3/3688 |
| 9,483,131 | B2 * | 11/2016 | Hong | G06F 3/038 |
| 9,837,040 | B2 * | 12/2017 | Moon | G09G 3/2092 |
| 9,928,799 | B2 * | 3/2018 | Lee | G09G 3/3688 |
| 10,467,975 | B2 * | 11/2019 | Suh | G09G 3/3291 |
| 10,559,280 | B2 * | 2/2020 | Bae | G09G 3/3696 |
| 2002/0171613 | A1 * | 11/2002 | Goto | G09G 3/3688 |
| | | | | 345/87 |
| 2004/0085503 | A1 * | 5/2004 | Kim | G02F 1/134363 |
| | | | | 349/141 |
| 2004/0150596 | A1 * | 8/2004 | Uchida | G09G 3/3666 |
| | | | | 345/84 |
| 2004/0150653 | A1 * | 8/2004 | Sakamaki | G09G 3/3611 |
| | | | | 345/592 |
| 2004/0196231 | A1 * | 10/2004 | Goto | G09G 3/3688 |
| | | | | 345/87 |
| 2004/0222985 | A1 * | 11/2004 | Kimura | G09G 3/3283 |
| | | | | 345/212 |
| 2004/0227717 | A1 * | 11/2004 | Yeh | G09G 3/3648 |
| | | | | 345/100 |
| 2005/0264518 | A1 * | 12/2005 | Nojiri | G09G 3/3688 |
| | | | | 345/103 |
| 2006/0139286 | A1 * | 6/2006 | Kida | G09G 3/3688 |
| | | | | 345/98 |
| 2006/0262133 | A1 * | 11/2006 | Sakamaki | G09G 3/3611 |
| | | | | 345/592 |
| 2007/0008252 | A1 * | 1/2007 | Seki | G09G 3/2025 |
| | | | | 345/76 |
| 2007/0216612 | A1 * | 9/2007 | Shin | G09G 3/3291 |
| | | | | 345/76 |
| 2008/0106535 | A1 * | 5/2008 | Kim | G09G 3/3648 |
| | | | | 345/205 |
| 2009/0219265 | A1 | 9/2009 | Lee et al. | |
| 2010/0039413 | A1 * | 2/2010 | Nakayama | G09G 3/3688 |
| | | | | 345/205 |
| 2011/0012822 | A1 * | 1/2011 | Park | G09G 3/3614 |
| | | | | 345/99 |
| 2011/0025670 | A1 | 2/2011 | Park et al. | |
| 2011/0181558 | A1 * | 7/2011 | Jeon | G09G 3/3611 |
| | | | | 345/204 |
| 2012/0127143 | A1 * | 5/2012 | Gondo | G09G 3/3648 |
| | | | | 345/208 |
| 2012/0133577 | A1 * | 5/2012 | Gondo | G09G 3/3614 |
| | | | | 345/96 |
| 2013/0285998 | A1 * | 10/2013 | Hong | G06F 3/038 |
| | | | | 345/212 |
| 2014/0062995 | A1 * | 3/2014 | Kim | G09G 3/3688 |
| | | | | 345/214 |
| 2014/0118418 | A1 * | 5/2014 | Kondo | G09G 3/20 |
| | | | | 345/690 |
| 2015/0015472 | A1 * | 1/2015 | Nakayama | G09G 3/3688 |
| | | | | 345/98 |
| 2016/0093237 | A1 * | 3/2016 | Lee | G09G 3/3688 |
| | | | | 345/690 |
| 2016/0098959 | A1 * | 4/2016 | Moon | G09G 3/2092 |
| | | | | 345/205 |
| 2017/0270863 | A1 * | 9/2017 | Suh | G09G 3/3648 |
| 2018/0268780 | A1 * | 9/2018 | Bae | G09G 5/10 |
| 2019/0028098 | A1 * | 1/2019 | Park | H01L 21/82346 |
| 2019/0147800 | A1 * | 5/2019 | Bae | G09G 3/3233 |
| | | | | 345/173 |

FOREIGN PATENT DOCUMENTS

| | | |
|---|---|---|
| KR | 10-0986041 | 10/2010 |
| KR | 10-2011-0013687 | 2/2011 |
| KR | 10-1333519 | 11/2013 |
| KR | 10-1351381 | 1/2014 |

* cited by examiner

DISPLAY DEVICE AND METHOD FOR CONTROLLING INDEPENDENTLY BY A GROUP OF PIXELS

CROSS-REFERENCE TO RELATED APPLICATION

This application is based on and claims priority under 35 U.S.C. § 119 to Korean Patent Application No. 10-2017-0151969, filed on Nov. 15, 2017, in the Korean Intellectual Property Office, the disclosure of which is incorporated by reference herein its entirety.

BACKGROUND

1. Field

The present disclosure relates to a technology for charging pixels included in a display.

2. Description of Related Art

An electronic device, which is equipped with a display, such as a smartphone, a wearable device, or the like has been widely supplied as mobile communication technologies develop. A user may execute various functions such as a photo or video capturing function, a music or video file playing function, a game function, an Internet function, and the like through a screen output from the display.

As the demand for clearer and cleaner screens increases, the display with high resolution (e.g., 2560×1440) has been distributed increasingly. That is, when the number of pixels included in the display increases, the display may provide a user with the clearer and cleaner screen.

However, when the number of pixels increases, a display driver integrated circuit may not have enough time to charge each of the pixels. As such, it may be difficult for the display driver integrated circuit to charge the pixels to the voltage level required by each of the pixels. The voltage level lower than the voltage level required by each of the pixels may distort the screen or may cause a flicker phenomenon.

In addition, when the number of pixels increases, the amount of data to be processed by the display driver integrated circuit may increase. The increase of the data may slow the driving speed of the display.

SUMMARY

Aspects of the present disclosure are provided to address at least the above-mentioned problems and/or disadvantages and provide at least the advantages described below. Accordingly, an aspect of the present disclosure is to provide an electronic device (e.g., a display device or a portable communication device including the same), and a method of controlling the same for addressing the above-described problem and problems brought up in this disclosure.

In accordance with an aspect of the present disclosure, a display driver integrated circuit may include a controller configured to receive first image data from an application processor disposed outside the display driver integrated circuit, and a data driver configured to receive the first image data from the controller. The data driver may include a group of shift registers configured to convert the first image data to second image data, a first group of latches configured to receive the second image data from the group of shift registers to store the second image data, a second group of latches configured to receive the second image data from the first group of latches to store the second image data, a group of converters configured to convert a first portion or a second portion of the second image data into a data voltage for causing at least part of pixels of a pixel group corresponding to a first pixel group and a second pixel group to display light, and a group of amplifiers configured to output the data voltage to the at least part of the pixels. Before transmission of the second image data from the first group of latches to the second group of latches is completed, the controller may be configured to cause the second group of latches to transmit a portion of the second image data, the transmission to the second group of latches of which is completed, among the first portion of the second image data and the second portion of the second image data to the converters. The group of shift registers may include a first shift register corresponding to a first pixel group of at least one pixel line of a display panel connected to the display driver integrated circuit, and a second shift register corresponding to a second pixel group of the at least one pixel line. The first group of latches may include a first latch configured to store a first portion of the second image data received from the first shift register, and a second latch configured to store a second portion of the second image data received from the second shift register. The second group of latches may include a third latch configured to store the first portion received from the first latch, and a fourth latch configured to store the second portion received from the second latch.

In accordance with another aspect of the present disclosure, a display may include a display panel in which a plurality of pixels and at least one pixel line electrically connected to each of the pixels are disposed and a display driver integrated circuit electrically connected to the at least one pixel line. The display driver integrated circuit may include a timing controller configured to receive first image data from an application processor; and a data driver including a group of shift registers configured to convert the first image data to second image data, a first group of latches configured to receive the second image data from the group of shift registers to store the second image data, a group of converters configured to convert the second image data to a data voltage for causing the pixels to display light, a group of amplifiers configured to output the data voltage to the display panel, and a second group of latches configured to receive the second image data from the first group of latches to transmit the second image data to the group of converters. The timing controller may be configured to cause the second group of latches to transmit the stored second image data to the group of converters during a time interval in which the first group of latches stores the second image data.

In accordance with another aspect of the present disclosure, an electronic device may include a display panel including a plurality of pixel lines, a display driver integrated circuit, and a processor. The processor may be configured to supply a plurality of signals corresponding to a first portion of the display data to the first pixel group using a first switch at a first point in time and to supply a plurality of signals corresponding to a second portion of the display data to a second pixel group using a second switch at a second point in time. At least one pixel line among the plurality of pixel lines may include a first pixel group connected to a first transmission line and a second pixel group connected to a second transmission line. The display driver integrated circuit may include a storage circuit configured to at least temporarily store display data to be displayed through the at least one pixel line, at least one first source amplifier connected to the first pixel group and at least one second source amplifier connected to the second pixel group, a first decoder connected to the first source amplifier and a second decoder connected to the second source amplifier, at least one first switch configured to control a connection between the first source amplifier and the first pixel group and at least one second switch configured to control a connection between the second source amplifier and the second pixel group.

According to various example embodiments of the present disclosure, it is possible to provide a user with a clear screen. Furthermore, according to various example embodiments of the present disclosure, it is possible to enhance a display driving speed.

A variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
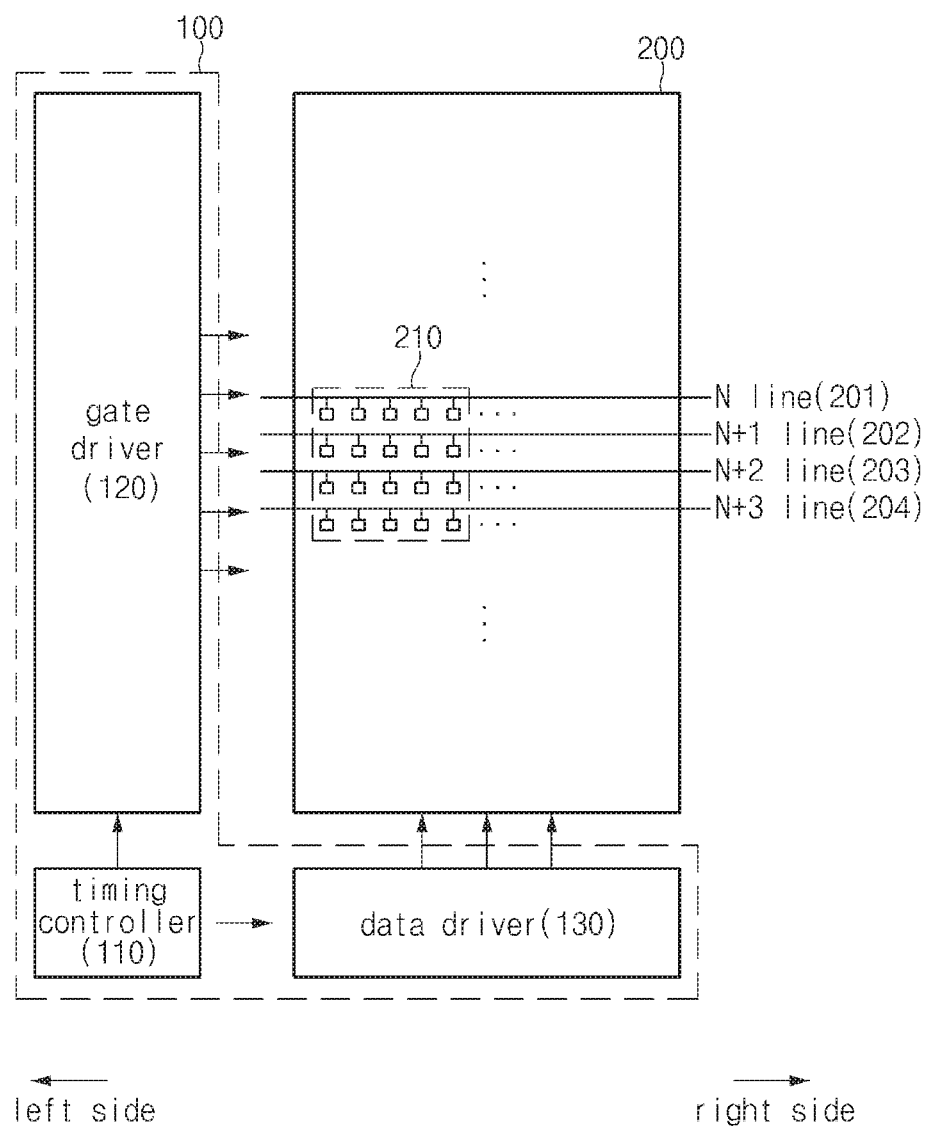
FIG. 1 is a block diagram illustrating a display in which a display driver integrated circuit and a display panel are simplified, according to an embodiment.

FIG. 1 illustrates a block diagram illustrating a display in which a display driver integrated circuit and a display panel are simplified, according to an embodiment. A display driver integrated circuit (DDI) (e.g., including display driving circuitry) 100 and a display panel 200 that are illustrated in FIG. 1 may be included in an electronic device 601 illustrated in FIG. 6.

Referring to FIG. 1, the DDI 100 may be electrically connected to lines disposed on the display panel 200. For example, the DDI 100 may be connected to gate lines 201, 202, 203, and 204 and data lines (not illustrated) (or pixel lines). The DDI 100 may transmit (e.g., forward) various kinds of signals through the gate lines 201, 202, 203, and 204 and the data lines and may cause pixels 210 connected to the gate lines 201, 202, 203, and 204 and the data lines to emit light or put pixels in a state to emit light (e.g., to display light).

According to an embodiment, the DDI 100 may include a timing controller 110 (or a controller), a gate driver (e.g., including gate driving circuitry) 120, and a data driver (e.g., including data driving circuitry) 130.

The timing controller 110 may receive control information and first image data from a processor (e.g., an application processor (not shown)). The control information may refer, for example, to data for controlling components included in the DDI 100 or for selecting the first image data. The first image data may refer to data associated with an image output through the display panel 200.

The timing controller 110 may generate a clock based on the control information. The clock may refer to electrical vibration applied to the components for the purpose of operating the components (e.g., the gate driver 120, and the data driver 130) included in the DDI 100 at a specified (e.g., constant) speed. The components may operate based on the clock generated by the timing controller 110.

The timing controller 110 may generate a gate control signal GCS for controlling the gate driver 120. The gate control signal may include a signal for controlling a point in time when the gate driver 120 applies a voltage to the gate lines 201, 202, 203, and 204, a signal for controlling a period in which the voltage is applied, or the like. The gate driver 120 may apply a gate voltage to the gate lines 201, 202, 203, and 204 based on the gate control signal. For example, the gate driver 120 may apply the gate voltage in order of the 'N' line 201, the 'N+1' line 202, the 'N+2' line 203, and the 'N+3' line 204. Transistors included in the pixels 210 may be turned on by the gate voltage. In the present disclosure, the gate driver 120 may be referred to, for example, as a "scan driver".

The timing controller 110 may transmit the first image data to the data driver 130. The data driver 130 may convert the first image data to second image data. The second image data may refer, for example, to data obtained by parallelizing the first image data. In the present disclosure, the data driver 130 may be referred to, for example, as a "source driver".

The data driver 130 may convert the second image data into a data voltage. The data voltage may refer to a voltage capable of charging a capacitive element (e.g., a capacitor) included in the pixels 210. When the capacitive element is charged and then a current flows into, for example, an organic light-emitting diode (OLED) by the charged voltage, the pixels 210 may emit light.

Figure 2:
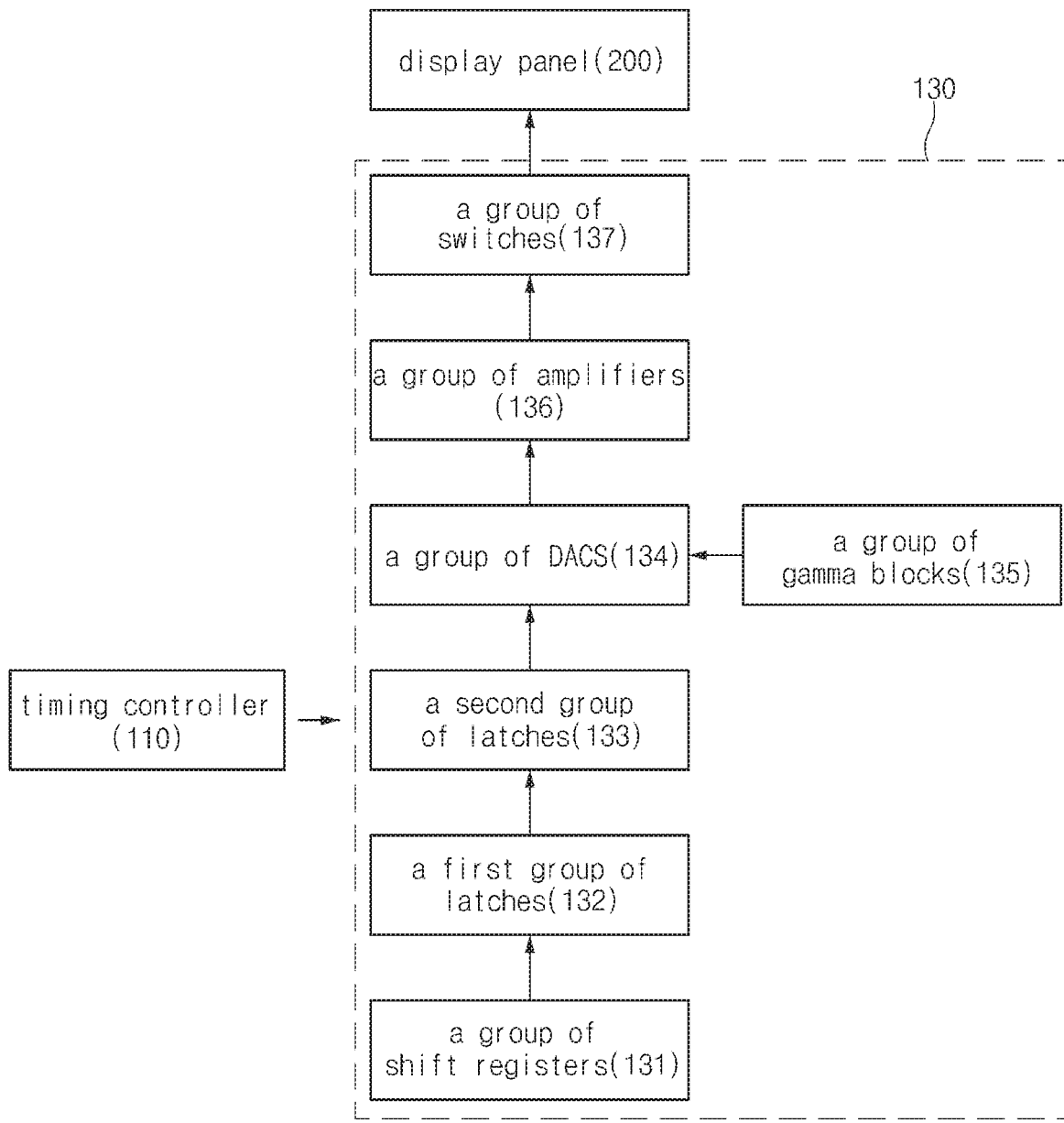
FIG. 2 is a block diagram illustrating a data driver, according to an embodiment.

FIG. 2 is a block diagram illustrating a data driver, according to an embodiment.

Referring to FIG. 2, the data driver 130 may include a group of shift registers 131, a first group of latches 132 (or a first group of storage circuits), a second group of latches 133 (or a second group of storage circuits), a group of digital analog converters 134 (or a group of decoders), a group of gamma blocks 135, a group of amplifiers 136, and a group of switches 137.

The group of shift registers 131 may receive first image data from the timing controller 110. The group of shift registers 131 may convert the first image data to second image data.

The first group of latches 132 may sequentially store the second image data received from the group of shift registers 131. For example, the first group of latches 132 may store the second image data in order from the second image data to be output to the left side of the 'N' line 201 to the second image data to be output to the right side of the 'N' line 201, or vice versa. When the second image data corresponding to the 'N' line 201 is stored completely, the first group of latches 132 may store the second image data to be output through the 'N+1' line 202. At this time, the first group of latches 132 may store the second image data in order from the second image data to be output to the left side of the 'N+1' line 202 to the second image data to be output to the right side of the 'N+1' line 202, or vice versa.

While the first group of latches 132 stores the second image data for each line, the second group of latches 133 may transmit the second image data of the corresponding line to the group of digital analog converters 134. For example, while the first group of latches 132 stores the second image data of the 'N' line 201, the second group of latches 133 may transmit the second image data, which is stored in the first group of latches 132, of the 'N' line 201, to the group of digital analog converters 134. For another example, while the first group of latches 132 stores the second image data of the 'N+1' line 202, the second group of latches 133 may transmit the second image data, which is stored in the first group of latches 132, of the 'N+1' line 202, to the group of digital analog converters 134.

The group of gamma blocks 135 may apply a gray scale voltage to the group of digital analog converters 134. The gray scale voltage may refer, for example, to a voltage for correcting the sensitivity of the user's eyes. For example, even though the brightness of light emitted from a pixel changes linearly, the user may feel the change in brightness of the light nonlinearly. The gray scale voltage may refer, for example, to a voltage for correcting the above-mentioned nonlinear characteristic.

The group of digital analog converters 134 may convert the second image data, which is received from the second group of latches 133, into a data voltage based on the gray scale voltage received from the group of gamma blocks 135. The data voltage may charge a capacitive element (e.g., a capacitor) included in the pixels 210, as the voltage applied to the pixels 210.

The group of amplifiers 136 may output the data voltage received from the group of digital analog converters 134, to the display panel 200. For example, when the data voltage applied to an input terminal (e.g., a terminal between the group of digital analog converters 134 and the group of amplifiers 136) of the group of amplifiers 136 is not less than a specific level, the group of amplifiers 136 may output the data voltage that is not less than the specific level.

The group of switches 137 may be opened or closed and thus may adjust the timing at which the data voltage is output to the display panel 200. For example, when the group of switches 137 is opened, the data voltage may not be transmitted to the display panel 200; when the group of switches 137 is closed, the data voltage may be transmitted to the display panel 200. In the present disclosure, the group of switches 137 may be referred to, for example, as a "group of source output switches" 137.

In accordance with the DDI based on a comparison example, a second group of latches may transmit the second image data stored in a first group of latches to a converter for each line. For example, after transmitting the second image data to be output through the 'N' line 201 to a group of digital analog converters, the second group of latches may transmit the second image data to be output through the 'N+1' line 202 to a group of digital analog converters. In accordance with the DDI based on the comparison example, since the second group of latches transmits the second image data corresponding to a line to a group of digital analog converters at a time, the amount of data to be processed by a group of digital analog converters may increase; it is understood that the load of a gamma block may increase in response to the data processing of the group of digital analog converters. The increase of the data may decrease the voltage level of the input terminal (e.g., a terminal between a group of digital analog converters and a group of amplifiers) of a group of amplifiers or may increase a time interval in which the voltage level increases to a specific level. As such, a flicker phenomenon may occur on the screen output through a display panel, or the screen output speed may be slow.

However, according to an embodiment of the present disclosure, while the first group of latches 132 stores the second image data for each line, the second group of latches 133 may transmit the second image data of the corresponding line to the group of digital analog converters 134. In other words, since the second group of latches 133 transmits a part of the stored second image data to the group of digital analog converters 134 without transmitting a large amount of second image data to the group of digital analog converters 134 at a time, the load of the group of digital analog converters 134 or the group of gamma blocks 135 may decrease. As such, the voltage level of the input terminal of the group of amplifiers 136 may increase to be greater than or equal to a specific range within a specified time interval (or a time required such that the voltage level of the input terminal of the group of amplifiers 136 increases to be greater than or equal to a specific range may be reduced). According to an embodiment of the present disclosure, the voltage level of the input terminal of the group of amplifiers 136 increases to be greater than or equal to a specific level within a specified time interval, thereby preventing and/or reducing a flicker phenomenon and increasing a display driving speed.

According to an embodiment, the timing controller 110 may sense a voltage of the input terminal of the group of amplifiers 136. When the sensed voltage is not greater than a specific level, the timing controller 110 may cause the second group of latches 133 to transmit the second image data to the group of digital analog converters 134. For example, when the voltage of the input terminal of the group of amplifiers 136 is not greater than the specific level, the timing controller 110 may transmit the second image data, and thus may rapidly increase the voltage of the input terminal of the group of amplifiers 136 to be greater than or equal to the specific level.

In the present disclosure, a description given with reference to FIGS. 1 and 2 may be applied to components that have the same reference marks as the DDI 100 and the display panel 200 illustrated in FIGS. 1 and 2.

Figure 3:
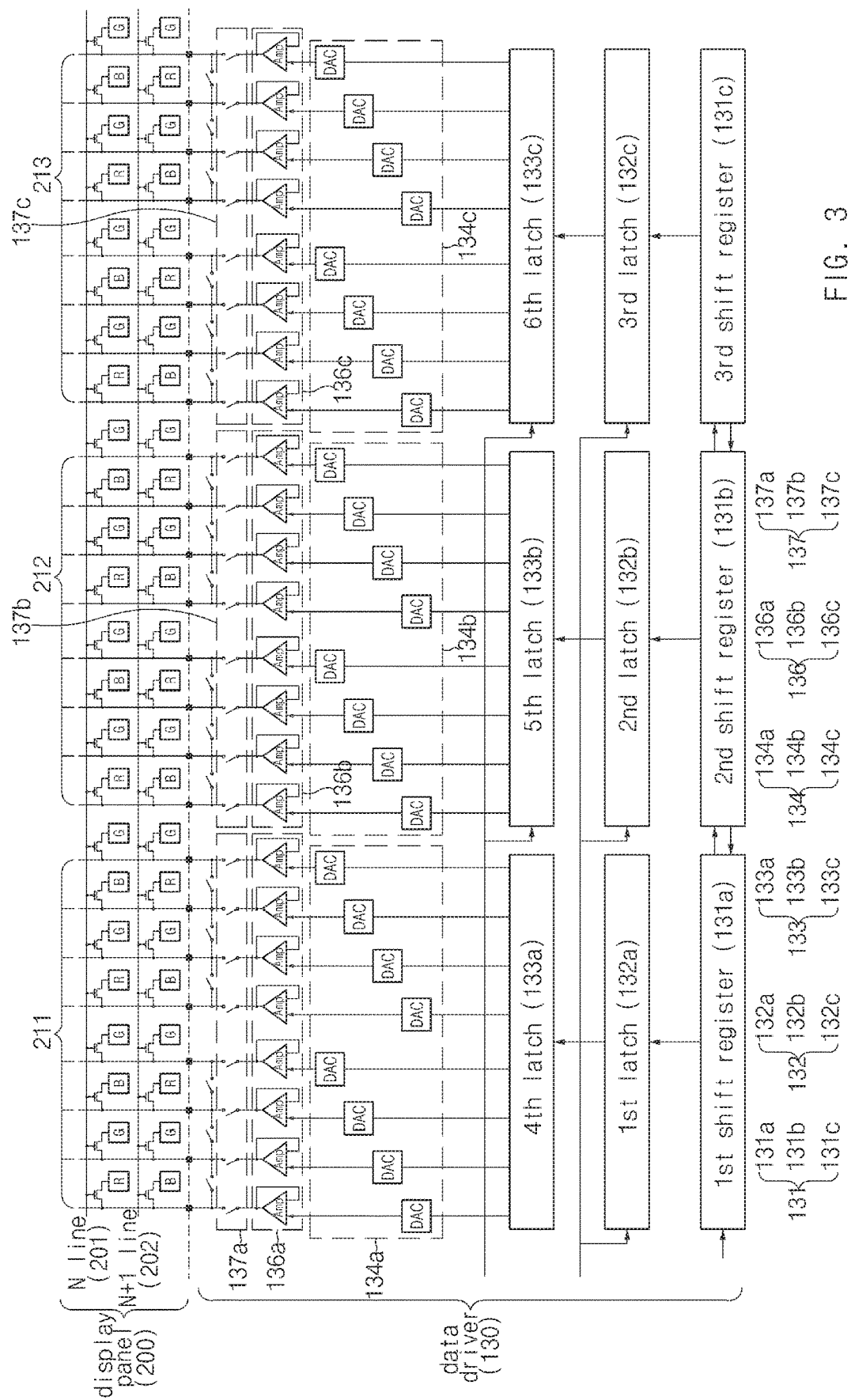
FIG. 3 is a diagram illustrating an enlarged view of a display panel and a data driver, according to an embodiment.

FIG. 3 is a diagram illustrating an enlarged view of a display panel and a data driver, according to an embodiment. FIG. 3 illustrates the combination relationship between the lines disposed in the display panel 200 and the data driver 130.

Referring to FIG. 3, the group of shift registers 131 may include a plurality of registers 131a, 131b, and 131c; the group of digital analog converters 134 may include a plurality of converters 134a, 134b, and 134c; the group of amplifiers 136 may include a plurality of amplifiers 136a, 136b, and 136c; and the group of switches 137 may include a plurality of switches 137a, 137b, and 137c.

The first group of latches 132 may include a first latch 132a, a second latch 132b, and a third latch 132c, and the second group of latches 133 may include a fourth latch 133a, a fifth latch 133b, and a sixth latch 133c. According to an embodiment, the latches 132a, 132b, and 132c included in the first group of latches 132 and the latches 133a, 133b, and 133c included in the second group of latches 133 may be different kinds of latches. For example, the latches 132a, 132b, and 132c included in the first group of latches 132 may store second image data received from the group of shift registers 131 simply. On the other hand, after receiving and storing the second image data from the first group of latches 132, the latches 133a, 133b, and 133c included in the second group of latches 133 may transmit the second image data to the group of digital analog converters 134.

According to an embodiment, the eight converters 134a may be connected to one latch (e.g., 133a) included in the second group of latches 133, and one amplifier may be connected to each of converters. One switch may be connected to each of amplifiers, and each of the amplifiers may be selectively connected to a specified sub pixel by using the connected switch. The above-described connection relationship is simply an example, and the scope of the embodiment of the present disclosure is not limited to the connection relationship illustrated in FIG. 3. For example, six converters may be connected to one latch (e.g., 133a).

The group of shift registers 131a, 131b, and 131c may convert first image data received from the timing controller 110, to the second image data.

The first group of latches 132a, 132b, and 132c may receive the second image data from the group of shift registers 131a, 131b, and 131c and may store the second image data for each line. For example, after storing image data corresponding to the 'N' line 201, the first group of latches 132a, 132b, and 132c may store image data corresponding to the 'N+1' line 202.

While the first group of latches 132a, 132b, and 132c store the image data for each line, the second group of latches 133a, 133b, and 133c may transmit the second image data received from the first group of latches 132a, 132b, and 132c, to the group of digital analog converters 134a, 134b, and 134c. For example, the first latch 132a may store second image data, which is to be output through first data lines 211 included in a first group, from among pieces of second image data corresponding to the 'N' line 201. The second latch 132b may store second image data, which is to be output through second data lines 212 included in a second group, from among the pieces of second image data corresponding to the 'N' line 201. The fourth latch 133a may transmit second image data to be output through the first data lines 211 to the converters 134a. In other words, while the second latch 132b stores second image data to be output through the second data lines 212, the fourth latch 133a may transmit second image data to be output through the first data lines 211, to the converters 134a. The converters 134a may convert the second image data to be output through the first data lines 211, to a data voltage based on the gray scale voltage received from the group of gamma blocks 135.

The above-mentioned details may be also applied to an operation in which the third latch 132c stores second image data to be output through third data lines 213 included in a third group. For example, while the third latch 132c stores second image data to be output through the third data lines 213, the fifth latch 133b may transmit second image data to be output through the second data lines 212, to the converters 134b. The converters 134b may convert second image data to be output through the second data lines 212, to a data voltage based on the gray scale voltage received from the group of gamma blocks 135.

When the voltage of an input terminal increases to be greater than or equal to a specific level, the group of amplifiers 136a, 136b, and 136c may output the data voltage to the group of switches 137a, 137b, and 137c.

The group of switches 137a, 137b, and 137c may be opened or closed and thus may adjust the timing at which the data voltage is output to the display panel 200. For example, when the switches 137a are closed, the data voltage may be transmitted to sub pixels connected to the 'N' line 201 and the first data lines 211. For another example, when the switches 137b are closed, the data voltage may be transmitted to sub pixels connected to the 'N' line 201 and the second data lines 212.

When the processing of the second image data corresponding to the 'N' line 201 is completed, the first latch 132a may store second image data, which is to be output through the first data lines 211, from among pieces of second image data corresponding to the 'N+1' line 202. Next, the second latch 132b may store second image data, which is to be output through the second data lines 212, from among the pieces of second image data corresponding to the 'N+1' line 202. At this time, the fourth latch 133a may transmit second image data to be output through the first data lines 211 to the converters 134a. In other words, while the second latch 132b stores second image data to be output through the second data lines 212, the fourth latch 133a may transmit second image data to be output through the first data lines 211, to the converters 134a. The converters 134a may convert second image data to be output through the first data lines 211, to a data voltage based on the gray scale voltage received from the group of gamma blocks 135.

The above-mentioned procedure may be also applied to an operation in which the third latch 132c stores second image data to be output through the third data lines 213. For example, while the third latch 132c stores second image data to be output through the third data lines 213, the fifth latch 133b may transmit second image data to be output through the second data lines 212, to the converters 134b. The converters 134b may convert second image data to be output through the second data lines 212, to a data voltage based on the gray scale voltage received from the group of gamma blocks 135.

When the voltage of an input terminal increases to be greater than or equal to a specific level, the group of amplifiers 136a, 136b, and 136c may output the data voltage to the group of switches 137a, 137b, and 137c.

The group of switches 137a, 137b, and 137c may be opened or closed and thus may adjust the timing at which the data voltage is output to the display panel 200. For example, when the switches 137a are closed, the data voltage may be transmitted to sub pixels connected to the 'N+1' line 202 and the first data lines 211. For another example, when the switches 137b are closed, the data voltage may be transmitted to sub pixels connected to the 'N+1' line 202 and the second data lines 212.

Figure 4A:
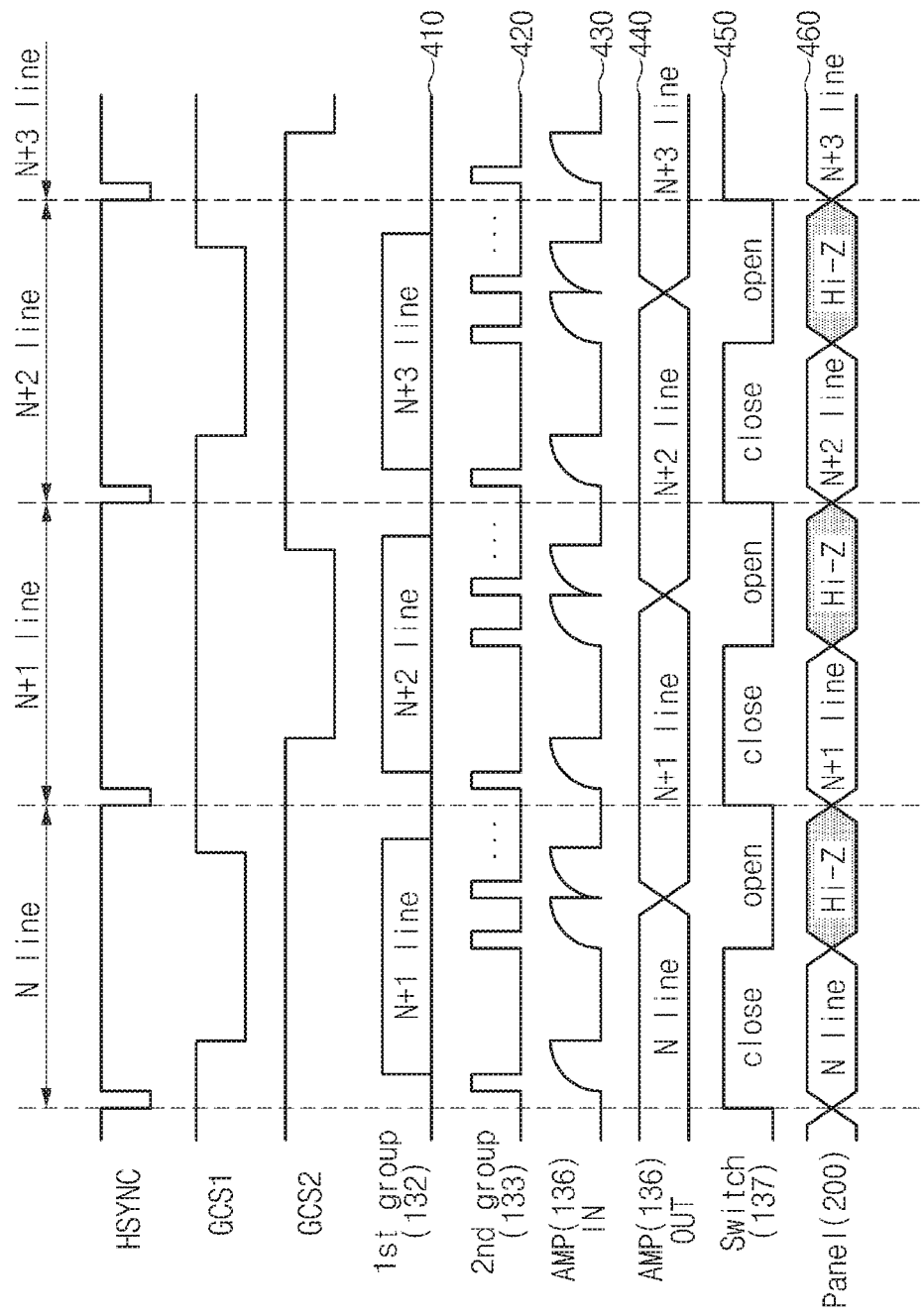
FIG. 4A is a timing diagram, according to an embodiment.

FIG. 4A is a diagram illustrating a timing, according to an embodiment. FIG. 4A illustrates the operation timing of each of the components illustrated in FIG. 3.

Referring to FIG. 4A, a synchronization signal HSYNC may be a clock generated by the timing controller 110. The components included in the DDI 100 may operate based on the synchronization signal HSYNC.

A first gate control signal GCS1 and a second gate control signal GCS2 may be a signal applied to the 'N' line 201 and the 'N+1' line 202, respectively. Next, the first gate control signal GCS1 and the second gate control signal GCS2 may be applied to the 'N+2' line 203 and the 'N+3' line 204, respectively. Transistors connected to the 'N' line 201, the 'N+1' line 202, the 'N+2' line 203, and the 'N+3' line 204 may be turned on by the first gate control signal GCS1 and the second gate control signal GCS2.

A graph 410 may indicate whether image data is stored in the first group of latches 132. In the graph 410, a high level indicates a state where the image data is stored in the first group of latches 132; a low level indicates a state where the image data is not stored in the first group of latches 132.

A graph 420 indicates the operation timing of the second group of latches 133. In the graph 420, a high level indicates a state where the second group of latches 133 transmits image data stored in the first group of latches 132 to the group of digital analog converters 134 (e.g., 134*a*, 134*b*, or 134*c*); a low level indicates a state where the second group of latches 133 does not transmit the image data.

A graph 430 indicates the voltage of the input terminal (e.g., the terminal or wiring between the group of digital analog converters 134 and the group of amplifiers 136) of the group of amplifiers 136; and a graph 440 indicates the data voltage of an output terminal of the group of amplifiers 136.

A graph 450 indicates whether the group of switches 137 is opened or closed. In the graph 450, a high level indicates that the group of switches 137 is closed; a low level indicates that the group of switches 137 is opened.

A graph 460 indicates the voltage input to the display panel 200.

Referring to the graph 410, the first group of latches 132 may receive second image data from the group of shift registers 131 to store the second image data for each line. For example, after storing the second image data corresponding to the 'N+1' line 202, the first group of latches 132 may store the second image data corresponding to the 'N+2' line 203. Next, the first group of latches 132 may store second image data corresponding to the 'N+3' line 204.

Referring to the graph 420, while the first group of latches 132 stores second image data for each line, the second group of latches 133 may transmit the second image data stored in the first group of latches 132, to the group of digital analog converters 134. For example, while the first group of latches 132 stores second image data corresponding to the 'N+1' line 202, the second group of latches 133 may transmit second image data, which is stored in the first group of latches 132 and which corresponds to the 'N+1' line 202, to the group of digital analog converters 134.

According to an embodiment, while the first group of latches 132 stores second image data corresponding to the 'N+1' line 202, the second group of latches 133 may operate at least once or a plurality of times. For example, while the first group of latches 132 stores the second image data corresponding to the 'N+1' line 202, the second group of latches 133 may transmit a part of the second image data stored in the first group of latches 132 to the group of digital analog converters 134 in twice. The above-described number of times that the second group of latches 133 operates is exemplary, and the scope of the embodiment of the present disclosure is not limited to the specific number of times.

Referring to the graph 430, since the second group of latches 133 transmits a part of the second image data stored in the first group of latches 132 to the group of digital analog converters 134 a plurality of times, the voltage of the input terminal of the group of amplifiers 136 may increase or decrease repeatedly. For example, whenever the second group of latches 133 transmits the second image data, the voltage of the input terminal of the group of amplifiers 136 may increase. On the other hand, when the second group of latches 133 does not transmit the second image data, the voltage of the input terminal of the group of amplifiers 136 may decrease.

Referring to the graph 440, while the first group of latches 132 stores the second image data, the data voltage may be output through the output terminal of the group of amplifiers 136. In other words, while the first group of latches 132 stores the second image data, the second group of latches 133 may transmit the second image data stored in the first group of latches 132, to the group of digital analog converters 134. The group of digital analog converters 134 may convert the second image data into a data voltage based on a gray scale voltage, and the converted data voltage may be output through the output terminal of the group of amplifiers 136. As such, while the first group of latches 132 stores the second image data, the data voltage may be output to the output terminal of the group of amplifiers 136.

Referring to the graph 450 and the graph 460, the timing at which the data voltage is output to the display panel 200 may be changed depending on the event that the group of switches 137 is opened or closed. For example, during at least part of a time interval in which the first group of latches 132 stores the second image data, the group of switches 137 may be closed. On the other hand, while the second group of latches 133 transmits the second image data to the group of digital analog converters 134, the group of switches 137 may be opened. Since the group of switches 137 is opened, the data voltage may not be outputted to the display panel 200. For another example, the group of switches 137 may be closed in synchronization with the synchronization signal HSYNC. When the group of switches 137 is closed, the data voltage may be output to the display panel 200.

Figure 4B:
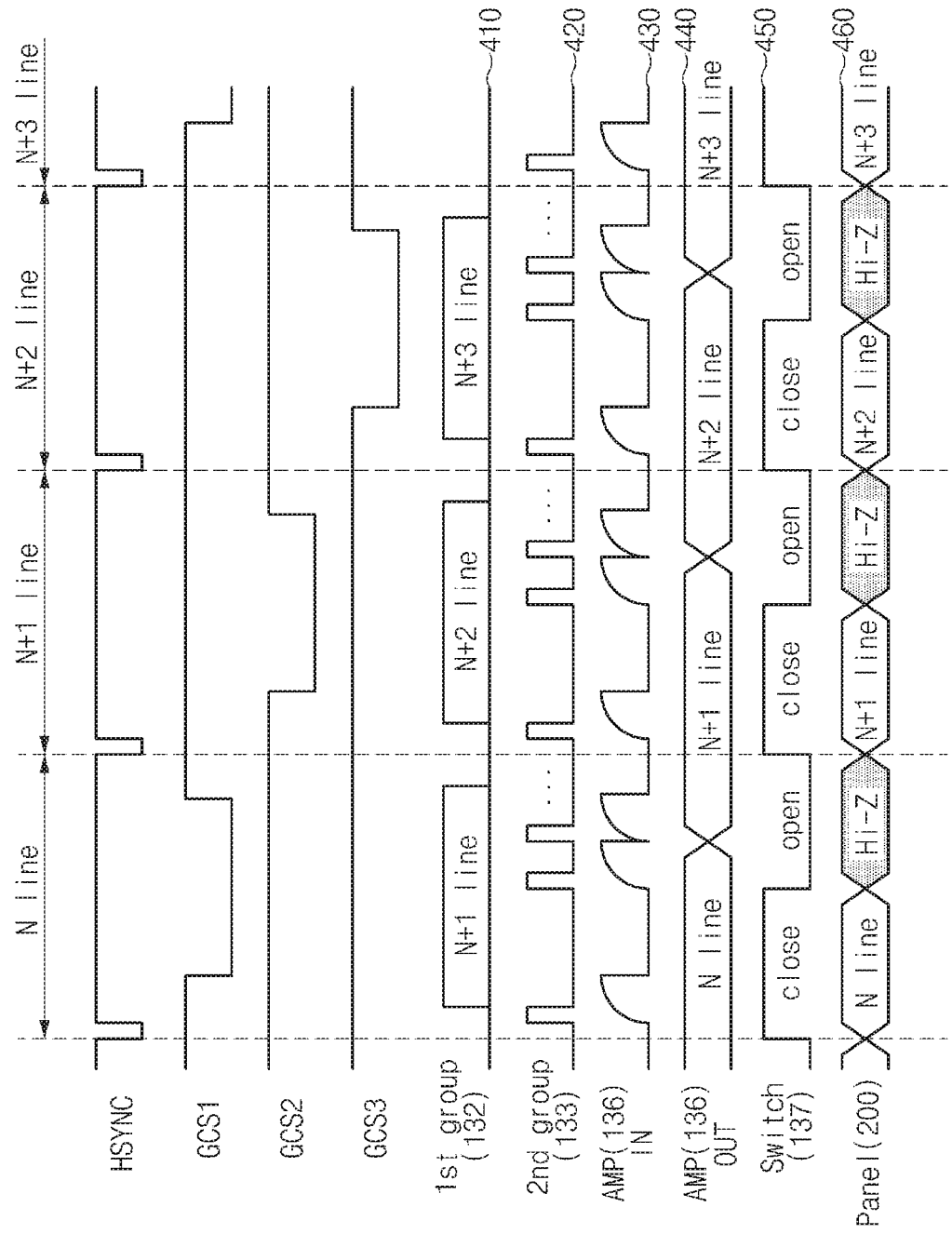
FIG. 4B is a timing diagram, according to another embodiment.

FIG. 4B is a timing diagram, according to another embodiment. In comparison with FIG. 4B and FIG. 4A, a gate control signal and the timing at which the gate control signal is applied to gate lines may be different. In FIG. 4A, details about the remaining components other than the gate control signal may be identically applied to FIG. 4B.

Referring to FIG. 4B, a first gate control signal GCS1, a second gate control signal GCS2, and a third gate control signal GCS3 may be sequentially applied to gate lines. For example, the first gate control signal GCS1, the second gate control signal GCS2, and the third gate control signal GCS3 may be applied to the 'N' line 201, the 'N+1' line 202, and the 'N+2' line 203, respectively. Next, the first gate control signal GCS1, the second gate control signal GCS2, and the third gate control signal GCS3 may be applied to the 'N+3' line 204, an 'N+4' line, and an 'N+5' line, respectively. Transistors connected to the 'N' line 201, the 'N+1' line 202, the 'N+2' line 203, the 'N+3' line 204, the 'N+4' line, and the 'N+5' line may be sequentially turned on by the first gate control signal GCS1, the second gate control signal GCS2, and the third gate control signal GCS3.

Although not illustrated in FIG. 4B, a fourth gate control signal may be sequentially applied to gate lines. In this case, the first gate control signal GCS1, the second gate control signal GCS2, the third gate control signal GCS3, and the fourth gate control signal may be applied to the 'N' line 201, the 'N+1' line 202, the 'N+2' line 203, and the 'N+3' line 204, respectively. Transistors connected to the 'N' line 201, the 'N+1' line 202, the 'N+2' line 203, and the 'N+3' line 204 may be sequentially turned on by the first gate control signal GCS1, the second gate control signal GCS2, the third gate control signal GCS3, and the fourth gate signal. The number of gate control signals illustrated in FIGS. 4A and 4B is exemplary, and embodiments of the present disclosure are not limited to FIGS. 4A and 4B.

Figure 5A:
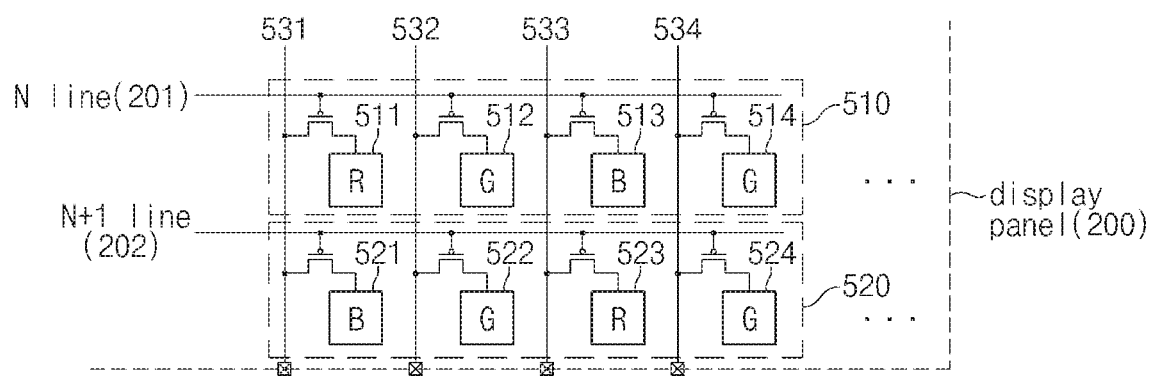
FIG. 5A is a diagram illustrating a structure of a pixel, according to an embodiment.
Figure 5B:
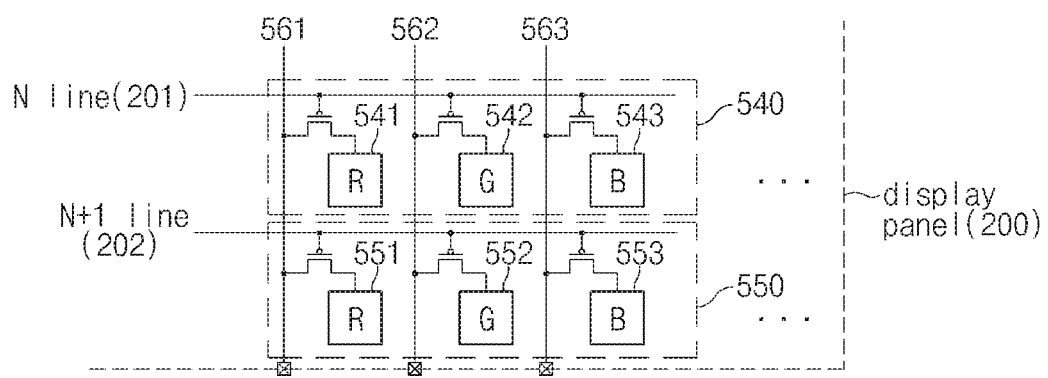
FIG. 5B is a diagram illustrating a structure of a pixel, according to another embodiment.

FIG. 5A is a diagram illustrating a structure of a pixel, according to an embodiment. FIG. 5B illustrates a structure of a pixel, according to another embodiment.

Referring to FIG. 5A, sub pixels 511, 512, 513, and 514 may be disposed on the 'N' line 201 (or on the 'N+1' line 202) in order of the red sub pixel 511, the green sub pixel 512, the blue sub pixel 513, the green sub pixel 514, and a red sub pixel (not shown). The structure illustrated in FIG. 5A may be referred to as a "pentile layout", as a structure applied to the embodiment illustrated in FIG. 3. In this case, one pixel structure 510 or 520 may include four sub pixels 511, 512, 513, and 514, or 521, 522, 523, and 524. In the meantime, two sub pixels may comprise one pixel. For example, the red sub pixel 511 and the green sub pixel 512 may comprise one pixel, and the blue sub pixel 513 and the green sub pixel 514 may comprise one pixel. Since the four sub pixels 511, 512, 513, and 514, or 521, 522, 523, and 524 are included in one pixel structure 510 or 520, four data lines 531, 532, 533, and 534 may be required to drive one pixel structure 510 or 520. Furthermore, the amplifiers (e.g., 136a) and the converters (e.g., 134a) described in FIG. 3 may be connected to each of four data lines 531, 532, 533, and 534.

Referring to FIG. 5B, sub pixels 541, 542, and 543 may be disposed on the 'N' line 201 (or on the 'N+1' line 202) in order of the red sub pixel 541, the green sub pixel 542, the blue sub pixel 543, and a red sub pixel (not shown). The structure of a pixel 540 or 550 illustrated in FIG. 5B may be referred to as a "RGB stripe layout", as a pixel structure different from the embodiment illustrated in FIG. 3.

According to an embodiment of the present disclosure, the details about the data driver 130 illustrated in FIGS. 1 to 4B may be applied to the structure of the pixel 540 or 550 illustrated in FIG. 5B. That is, since the one pixel 540 or 550 includes three sub pixels 541, 542, and 543, or 551, 552, and 553, the structure of the pixel 540 or 550 illustrated in FIG. 5B may need three data lines 561, 562, and 563 to drive one pixel 540 or 550. The amplifiers (e.g., a part of 136a) and the converters (e.g., a part of 134a) described in FIG. 3 may be connected to each of the three data lines 561, 562, and 563. As such, six amplifiers (e.g., a part of 136a) and six converters (e.g., a part of 134a) may be connected to one latch (e.g., 133a) of the second group of latches 133. One latch (e.g., 133a) of the second group of latches 133 may be connected to one latch (e.g., 132a) of the first group of latches 132; while one latch (e.g., 132a) of the first group of latches 132 stores image data, one latch (e.g., 133a) of the second group of latches 133 may transmit second image data stored in one latch (e.g., 132a) of the first group of latches 132, to converters (e.g., a part of 134a).

According to an embodiment of the present disclosure, a display driver integrated circuit may include a controller configured to receive first image data from an application processor disposed outside the display driver integrated circuit, and a data driver configured to receive the first image data from the controller. The data driver may include a group of shift registers configured to convert the first image data to second image data, a first group of latches configured to receive the second image data from the group of shift registers to store the second image data, a second group of latches configured to receive the second image data from the first group of latches to store the second image data, a group of converters comprising digital analog converting circuitry configured to convert the first portion and/or the second portion of the second image data into a data voltage for causing at least part of pixels of a pixel group corresponding to the first pixel group and the second pixel group to emit or display light, and a group of amplifiers configured to output the data voltage to the at least part of pixels. Before transmission of the second image data from the first group of latches to the second group of latches is completed, the controller may be configured to cause the second group of latches to transmit a portion of the second image data, the transmission to the second group of latches of which is completed, from among the first portion of the second image data and the second portion of the second image data to the converters. The group of shift registers may include a first shift register corresponding to a first pixel group of at least one pixel line of a display panel connected to the display driver integrated circuit, and a second shift register corresponding to a second pixel group of the at least one pixel line. The first group of latches may include a first latch configured to store a first portion of the second image data received from the first shift register, and a second latch configured to store a second portion of the second image data received from the second shift register. The second group of latches may include a third latch configured to store the first portion of the second image data received from the first latch, and a fourth latch configured to store the second portion of the second image data received from the second latch.

According to an embodiment of the present disclosure, a first time interval in which the first group of latches stores the second image data and a second time interval in which the second group of latches transmits the stored second image data to the group of converters may overlap at least partly with each other.

According to an embodiment of the present disclosure, the group of amplifiers may include an input terminal configured to receive the data voltage as an input, and the controller may be configured to cause the second group of latches to transmit the stored second image data to the group of converters based on a voltage of the input terminal.

According to an embodiment of the present disclosure, the controller may be configured to cause the second group of latches to transmit the stored second image data to the group of converters based at least on a specified time period.

According to an embodiment of the present disclosure, the data driver may further include a group of switches interposed between the group of amplifiers and the display panel, and the controller may be configured to adjust a timing at which the data voltage is output, by opening and closing of the group of switches.

According to an embodiment of the present disclosure, a first time interval in which at least one of the group of switches is opened may overlap at least partly with a second time interval in which the second group of latches transmits the stored second image data to the converters.

According to an embodiment of the present disclosure, a first time interval in which at least one of the group of switches is closed may overlap at least partly with a second time interval in which the first group of latches stores the second image data.

According to an embodiment of the present disclosure, the data driver may further include a gamma circuit configured to generate a gray scale voltage to apply to the group of converters, and the group of converters may be configured to convert the first portion and/or the second portion of the second image data into the data voltage based on the gray scale voltage.

According to an embodiment of the present disclosure, the controller may be configured to cause the data driver to output the data voltage through the at least one pixel line.

According to an embodiment of the present disclosure, the display driver integrated circuit may further include a gate driver electrically connected to the at least one pixel line and configured to control on/off of a transistor connected to the at least one pixel line.

According to an embodiment of the present disclosure, the controller may be configured to receive control information for generating a clock from the application processor, and the data driver may operate in synchronization with the clock.

According to an embodiment of the present disclosure, the second image data corresponds to data obtained by parallelizing the first image data.

According to an embodiment of the present disclosure, a display may include a display panel in which a plurality of pixels and at least one pixel line electrically connected to each of the pixels are disposed and a display driver integrated circuit electrically connected to the at least one pixel line. The display driver integrated circuit may include a timing controller configured to receive first image data from an application processor; and a data driver including a group of shift registers configured to convert the first image data to second image data, a first group of latches configured to receive the second image data from the group of shift registers to store the second image data, a group of converters configured to convert the second image data to a data voltage for causing the pixels to emit or display light, a group of amplifiers configured to output the data voltage to the display panel, and a second group of latches configured to receive the second image data from the first group of latches to transmit the second image data to the group of converters. The timing controller may be configured to cause the second group of latches to transmit the stored second image data to the group of converters during a time interval in which the first group of latches stores the second image data.

According to an embodiment of the present disclosure, the data driver may further include a group of switches interposed between the group of amplifiers and the display panel, and the timing controller may be configured to adjust a timing in which the data voltage is output, by opening or closing the group of switches.

According to an embodiment of the present disclosure, the data driver may further include a gamma circuit configured to generate a gray scale voltage to apply to the group of converters, and the group of converters may be configured to convert the second image data to the data voltage based on the gray scale voltage.

According to an embodiment of the present disclosure, an electronic device may include a display panel including a plurality of pixel lines, a display driver integrated circuit, and a processor. The processor may be configured to supply a plurality of signals corresponding to a first portion of the display data to the first pixel group using the first switch at a first point in time and to supply a plurality of signals corresponding to a second portion of the display data to the second pixel group using the second switch at a second point in time. At least one pixel line among the plurality of pixel lines may include a first pixel group connected to a first transmission line and a second pixel group connected to a second transmission line. The display driver integrated circuit may include a storage circuit configured to at least temporarily store display data to be displayed through the at least one pixel line, at least one first source amplifier connected to the first pixel group and at least one second source amplifier connected to the second pixel group, a first decoder connected to the first source amplifier and a second decoder connected to the second source amplifier, at least one first switch for controlling a connection between the first source amplifier and the first pixel group and at least one second switch for controlling a connection between the second source amplifier and the second pixel group.

According to an embodiment of the present disclosure, the display driver integrated circuit may further include a gamma generating circuit configured to provide a gamma voltage associated with the display data to the first decoder and the second decoder.

According to an embodiment of the present disclosure, the storage circuit may include a first storage circuit and a second storage circuit. The first storage circuit may be configured to store the first portion of the display data, and the second storage circuit may be configured to transmit at least part of the stored first portion to the first decoder, while the first storage circuit stores the first portion of the display data.

According to an embodiment of the present disclosure, the first storage circuit may be configured to store the second portion of the display data and the second storage circuit may be configured to transmit at least part of the stored second portion to the second decoder, while the first storage circuit stores the second portion of the display data.

According to an embodiment of the present disclosure, the electronic device may further include an application processor configured to generate the display data. The display driver integrated circuit may further include a timing controller configured to receive the display data from the application processor.

Figure 6:
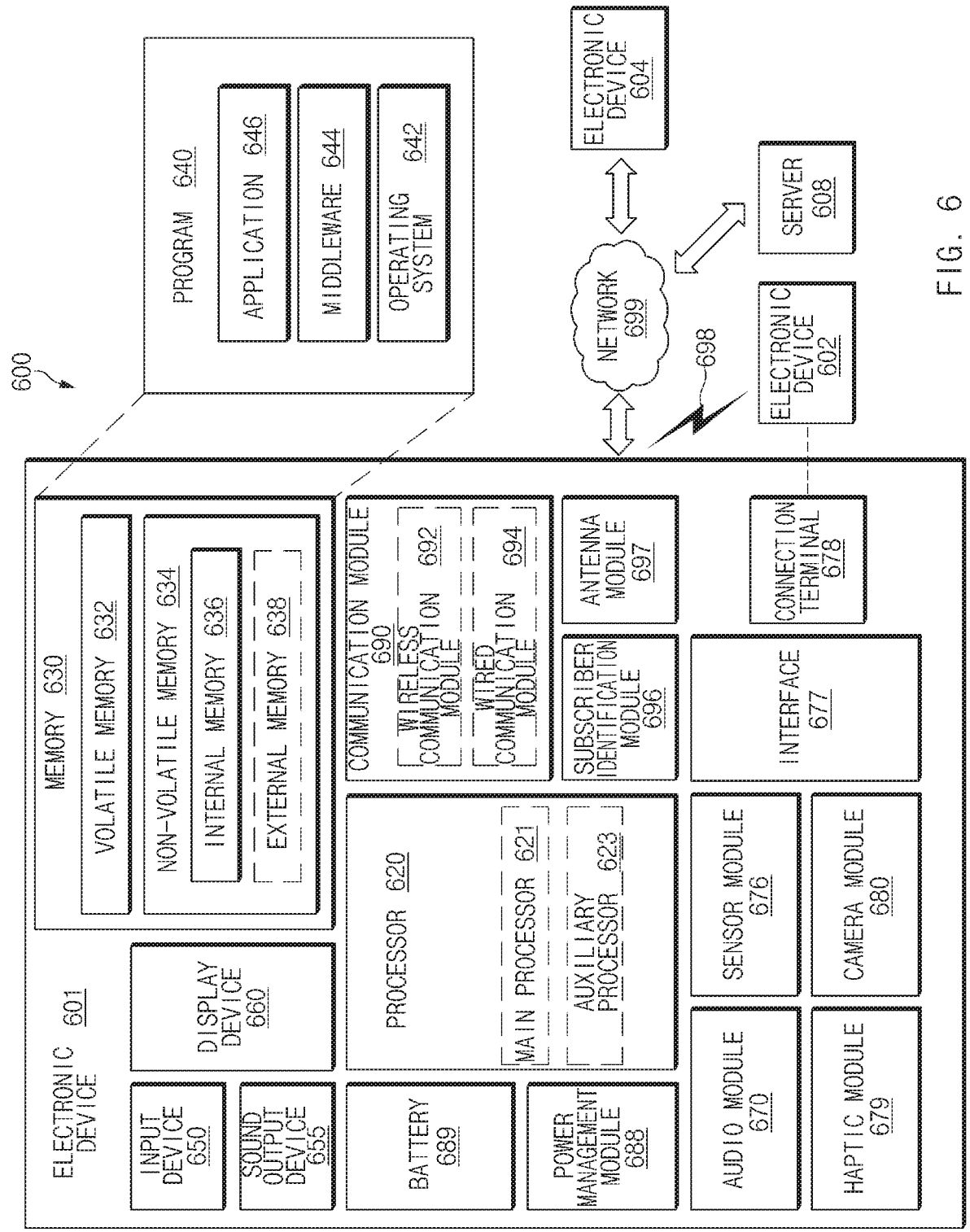
FIG. 6 is a block diagram illustrating an electronic device in a network environment according to various embodiments.

FIG. 6 is a block diagram of an electronic device in a network environment according to various embodiments.

Referring to FIG. 6, an electronic device 601 may communicate with an electronic device 602 through a first network 698 (e.g., a short-range wireless communication) or may communicate with an electronic device 604 or a server 608 through a second network 699 (e.g., a long-distance wireless communication) in a network environment 600. According to an embodiment, the electronic device 601 may communicate with the electronic device 604 through the server 608. According to an embodiment, the electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module 696, and an antenna module 697. According to some embodiments, at least one (e.g., the display device 660 or the camera module 680) among components of the electronic device 601 may be omitted or other components may be added to the electronic device 601. According to some embodiments, some components may be integrated and implemented as in the case of the sensor module 676 (e.g., a fingerprint sensor, an iris sensor, or an illuminance sensor) embedded in the display device 660 (e.g., a display).

The processor 620 may operate, for example, software (e.g., a program 640) to control at least one of other components (e.g., a hardware or software component) of the electronic device 601 connected to the processor 620 and may process and compute a variety of data. The processor 620 may load a command set or data, which is received from other components (e.g., the sensor module 676 or the communication module 690), into a volatile memory 632, may process the loaded command or data, and may store result data into a nonvolatile memory 634. According to an embodiment, the processor 620 may include a main processor 621 (e.g., a central processing unit or an application processor) and an auxiliary processor 623 (e.g., a graphic processing device, an image signal processor, a sensor hub processor, or a communication processor), which operates independently from the main processor 621, additionally or alternatively uses less power than the main processor 621, or is specified to a designated function. In this case, the auxiliary processor 623 may operate separately from the main processor 621 or embedded.

In this case, the auxiliary processor 623 may control, for example, at least some of functions or states associated with at least one component (e.g., the display device 660, the sensor module 676, or the communication module 690) among the components of the electronic device 601 instead of the main processor 621 while the main processor 621 is in an inactive (e.g., sleep) state or together with the main processor 621 while the main processor 621 is in an active (e.g., an application execution) state. According to an embodiment, the auxiliary processor 623 (e.g., the image signal processor or the communication processor) may be implemented as a part of another component (e.g., the camera module 680 or the communication module 690) that is functionally related to the auxiliary processor 623. The memory 630 may store a variety of data used by at least one component (e.g., the processor 620 or the sensor module 676) of the electronic device 601, for example, software (e.g., the program 640) and input data or output data with respect to commands associated with the software. The memory 630 may include the volatile memory 632 or the nonvolatile memory 634.

The program 640 may be stored in the memory 630 as software and may include, for example, an operating system 642, a middleware 644, or an application 646.

The input device 650 may be a device for receiving a command or data, which is used for a component (e.g., the processor 620) of the electronic device 601, from an outside (e.g., a user) of the electronic device 601 and may include, for example, a microphone, a mouse, or a keyboard.

The sound output device 655 may be a device for outputting a sound signal to the outside of the electronic device 601 and may include, for example, a speaker used for general purposes, such as multimedia play or recordings play, and a receiver used only for receiving calls. According to an embodiment, the receiver and the speaker may be either integrally or separately implemented.

The display device 660 may be a device for visually presenting information to the user of the electronic device 601 and may include, for example, a display, a hologram device, or a projector and a control circuit for controlling a corresponding device. According to an embodiment, the display device 660 may include a touch circuitry or a pressure sensor for measuring an intensity of pressure on the touch.

The audio module 670 may convert a sound and an electrical signal in dual directions. According to an embodiment, the audio module 670 may obtain the sound through the input device 650 or may output the sound through an external electronic device (e.g., the electronic device 602 (e.g., a speaker or a headphone)) wired or wirelessly connected to the sound output device 655 or the electronic device 601.

The sensor module 676 may generate an electrical signal or a data value corresponding to an operating state (e.g., power or temperature) inside or an environmental state outside the electronic device 601. The sensor module 676 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 677 may support a designated protocol wired or wirelessly connected to the external electronic device (e.g., the electronic device 602). According to an embodiment, the interface 677 may include, for example, an HDMI (high-definition multimedia interface), a USB (universal serial bus) interface, an SD card interface, or an audio interface.

A connecting terminal 678 may include a connector that physically connects the electronic device 601 to the external electronic device (e.g., the electronic device 602), for example, an HDMI connector, a USB connector, an SD card connector, or an audio connector (e.g., a headphone connector).

The haptic module 679 may convert an electrical signal to a mechanical stimulation (e.g., vibration or movement) or an electrical stimulation perceived by the user through tactile or kinesthetic sensations. The haptic module 679 may include, for example, a motor, a piezoelectric element, or an electric stimulator.

The camera module 680 may shoot a still image or a video image. According to an embodiment, the camera module 680 may include, for example, at least one lens, an image sensor, an image signal processor, or a flash.

The power management module 688 may be a module for managing power supplied to the electronic device 601 and may serve as at least a part of a power management integrated circuit (PMIC).

The battery 689 may be a device for supplying power to at least one component of the electronic device 601 and may include, for example, a non-rechargeable (primary) battery, a rechargeable (secondary) battery, or a fuel cell.

The communication module 690 may establish a wired or wireless communication channel between the electronic device 601 and the external electronic device (e.g., the electronic device 602, the electronic device 604, or the server 608) and support communication execution through the established communication channel. The communication module 690 may include at least one communication processor operating independently from the processor 620 (e.g., the application processor) and supporting the wired communication or the wireless communication. According to an embodiment, the communication module 690 may include a wireless communication module 692 (e.g., a cellular communication module, a short-range wireless communication module, or a GNSS (global navigation satellite system) communication module) or a wired communication module 694 (e.g., an LAN (local area network) communication module or a power line communication module) and may communicate with the external electronic device using a corresponding communication module among them through the first network 698 (e.g., the short-range communication network such as a Bluetooth, a Wi-Fi direct, or an IrDA (infrared data association)) or the second network 699 (e.g., the long-distance wireless communication network such as a cellular network, an internet, or a computer network (e.g., LAN or WAN)). The above-mentioned various communication modules 690 may be implemented into one chip or into separate chips, respectively.

According to an embodiment, the wireless communication module 692 may identify and authenticate the electronic device 601 using user information stored in the subscriber identification module 696 in the communication network.

The antenna module 697 may include one or more antennas to transmit or receive the signal or power to or from an external source. According to an embodiment, the communication module 690 (e.g., the wireless communication module 692) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 601 and the external electronic device 604 through the server 608 connected to the second network 699. Each of the electronic devices 602 and 604 may be the same or different types as or from the electronic device 601. According to an embodiment, all or some of the operations performed by the electronic device 601 may be performed by another electronic device or a plurality of external electronic devices. When the electronic device 601 performs some functions or services automatically or by request, the electronic device 601 may request the external electronic device to perform at least some of the functions related to the functions or services, in addition to or instead of performing the functions or services by itself. The external electronic device receiving the request may carry out the requested function or the additional function and transmit the result to the electronic device 601. The electronic device 601 may provide the requested functions or services based on the received result as is or after additionally processing the received result. To this end, for example, a cloud computing, distributed computing, or client-server computing technology may be used.

Figure 7:
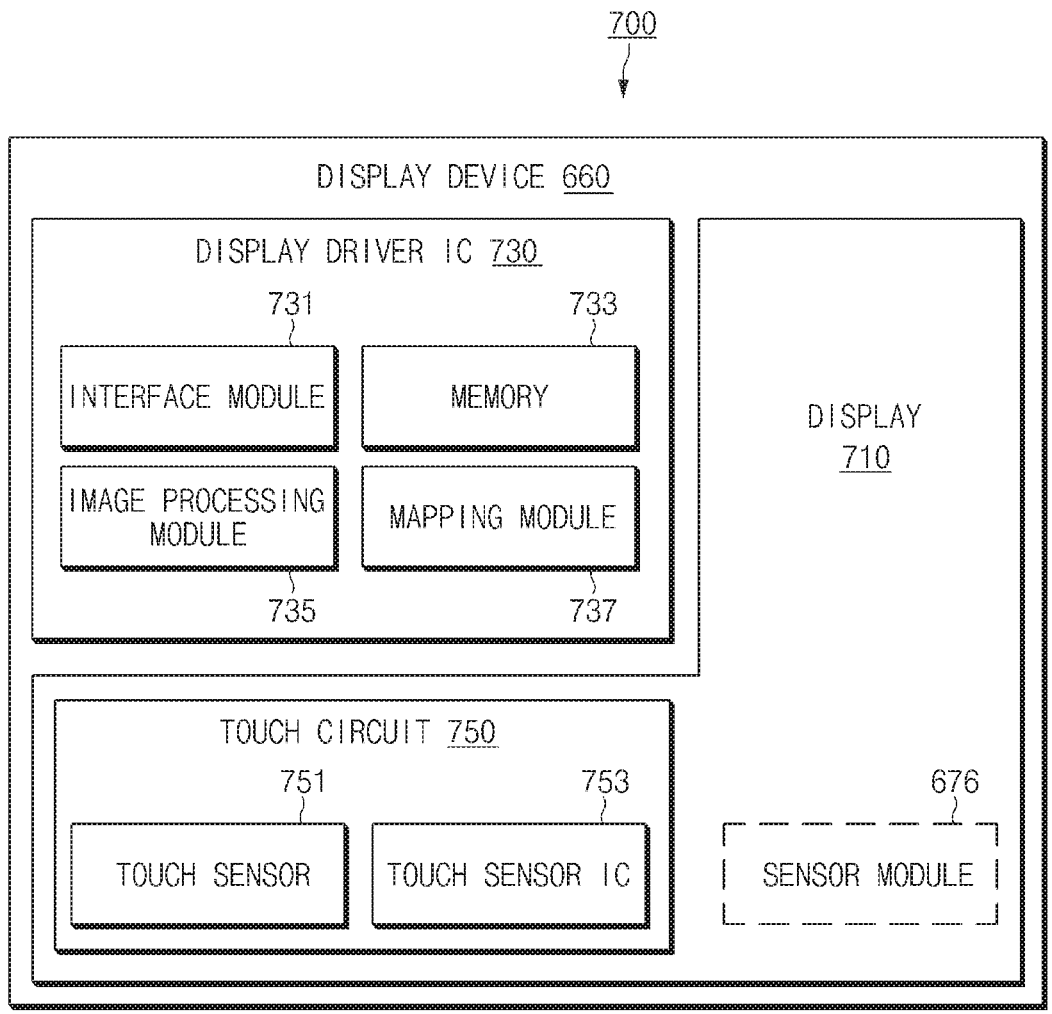
FIG. 7 is a block diagram illustrating a display device according to various embodiments.

FIG. 7 is a block diagram of a display device according to various embodiments.

Referring to FIG. 7, the display device 660 may include a display 710 and a display driver IC (DDI) 730 for controlling the display 710. The DDI 730 may include an interface module 731, a memory 733 (e.g., a buffer memory), an image processing module 735, or a mapping module 737. For example, the DDI 730 may receive image information including image data or an image control signal corresponding to a command for controlling the image data from a processor 620 (e.g., a main processor 621 or an application processor) or an auxiliary processor 623, which is operated independently of the main processor 621, through the interface module 731. The DDI 730 may communicate with a touch circuit 750, the sensor module 676, or the like through the interface module 731. In addition, the DDI 730 may store at least a part of the received image information in the memory 733, for example, in units of frames. For example, the image processing module 735 may perform preprocessing or post-processing (e.g., adjustment of resolution, brightness, or size) on at least a part of the image data based at least partially on characteristics of the image data or the display 710. The mapping module 737 may convert the image data preprocessed or post-processed through the image processing module 735 into a voltage value or a current value capable of driving the pixels, based at least partially on attributes of the pixels of the display 710 (e.g., an array of pixels (RGB stripe or pentile) or a size of each of subpixels). For example, at least some pixels of the display 710 may be driven based on the voltage or current value, such that visual information (e.g., a text, an image, or an icon) corresponding to the image data is displayed on the display 710.

According to an embodiment, the display device 660 may further include the touch circuit 750. The touch circuit 750 may include a touch sensor 751 and a touch sensor IC 753 for controlling the touch sensor 751. The touch sensor IC 753 may controls the touch sensor 751 to measure, for example, a change in a signal (e.g., a voltage, a light amount, a resistance, or a charge amount) at a specific position of the display 710 to sense a touch input or a hovering input, and may provide information (e.g., a location, an area, a pressure or a time) about the sensed touch input or hovering input to the processor 620. According to an embodiment, at least a part (e.g., the touch sensor IC 753) of the touch circuit 750 may be included as a part of the display driver IC 730 or the display 710, or as a part of another component (e.g., the auxiliary processor 623) arranged outside the display device 660.

According to an embodiment, the display device 660 may further include at least one sensor (e.g., a fingerprint sensor, an iris sensor, a pressure sensor or an illuminance sensor) of the sensor module 676, or a control circuitry thereof. In this case, the at least one sensor or the control circuitry thereof may be embedded in a part (e.g., the display 710 or the DDI 730) of the display device 660 or a part of the touch circuit 750. For example, when the sensor module 676 embedded in the display device 660 includes a biometric sensor (e.g., a fingerprint sensor), the biometric sensor may obtain biometric information associated with a touch input through an area of the display 710. As another example, when the sensor module 676 embedded in the display device 660 includes a pressure sensor, the pressure sensor may obtain information about a pressure corresponding to a touch input through an area or entire area of the display 710. According to an embodiment, the touch sensor 751 or the sensor module 676 may be arranged between pixels of the pixel layer of the display 710, or above or below the pixel layer.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 640) including an instruction stored in a machine-readable storage media (e.g., an internal memory 636 or an external memory 638) readable by a machine (e.g., a computer). The machine may be a device that calls the instruction from the machine-readable storage media and operates depending on the called instruction and may include the electronic device (e.g., the electronic device 601). When the instruction is executed by the processor (e.g., the processor 620), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display driver integrated circuit comprising:
a controller configured to receive first image data from an application processor disposed outside the display driver integrated circuit; and
a data driver configured to receive the first image data from the controller, wherein the data driver includes:
a group of shift registers configured to convert the first image data to second image data, wherein the group of shift registers includes a first shift register corresponding to a first pixel group of at least one pixel line of a display panel connected to the display driver integrated circuit, and a second shift register corresponding to a second pixel group of the at least one pixel line;
a first group of latches configured to receive the second image data from the group of shift registers and to store the second image data, wherein the first group of latches includes a first latch configured to store a first portion of the second image data received from the first shift register, and a second latch configured to store a second portion of the second image data received from the second shift register;
a second group of latches configured to receive the second image data from the first group of latches and to store the second image data, wherein the second group of latches includes a third latch configured to store the first portion of the second image data received from the first latch, and a fourth latch configured to store the second portion of the second image data received from the second latch;
a group of converters comprising digital analog converting circuitry configured to convert the first portion of the second image data and/or the second portion of the second image data into a data voltage for causing at least part of pixels of a pixel group corresponding to the first pixel group and the second pixel group to display light; and
a group of amplifiers configured to output the data voltage to the at least part of pixels,
wherein the controller is configured to:
before transmission of the second image data from the first group of latches to the second group of latches is completed,
cause the second group of latches to transmit, to the converters, a portion of the second image data, the transmission of which is completed to the second group of latches among the first portion of the second image data and the second portion of the second image data.

2. The display driver integrated circuit of claim 1, wherein a first time interval in which the first group of latches is configured to store the second image data and a second time interval in which the second group of latches is configured to transmit the stored second image data to the group of converters overlap at least partly with each other.

3. The display driver integrated circuit of claim 1, wherein the group of amplifiers includes an input terminal configured to receive the data voltage as an input, and
wherein the controller is configured to:
cause the second group of latches to transmit the stored second image data to the group of converters based on a voltage of the input terminal.

4. The display driver integrated circuit of claim 1, wherein the controller is configured to:
cause the second group of latches to transmit the stored second image data to the group of converters based at least on a specified time period.

5. The display driver integrated circuit of claim 1, wherein the data driver further includes a group of switches interposed between the group of amplifiers and the display panel, and
wherein the controller is configured to:
adjust a timing at which the data voltage is output, through opening and/or closing of the group of switches.

6. The display driver integrated circuit of claim 5, wherein a first time interval in which at least one of the group of switches is opened overlaps at least partly with a second time interval in which the second group of latches transmits the stored second image data to the converters.

7. The display driver integrated circuit of claim 5, wherein a first time interval in which at least one of the group of switches is closed overlaps at least partly with a second time interval in which the first group of latches stores the second image data.

8. The display driver integrated circuit of claim 1, wherein the data driver further includes a gamma circuit configured to generate a gray scale voltage to apply to the group of converters, and
wherein the group of converters is configured to convert the first portion of the second image data and/or the second portion of the second image data into the data voltage based on the gray scale voltage.

9. The display driver integrated circuit of claim 1, wherein the controller is configured to:
cause the data driver to output the data voltage through the at least one pixel line.

10. The display driver integrated circuit of claim 1, further comprising:
a gate driver electrically connected to the at least one pixel line and configured to control on/off of a transistor connected to the at least one pixel line.

11. The display driver integrated circuit of claim 1, wherein the controller is configured to:
receive control information for generating a clock from the application processor, and
wherein the data driver operates in synchronization with the clock.

12. The display driver integrated circuit of claim 1, wherein the second image data corresponds to data obtained by parallelizing the first image data.

13. A display comprising:
a display panel in which a plurality of pixels and at least one pixel line electrically connected to each of the pixels are disposed; and
a display driver integrated circuit electrically connected to the at least one pixel line,
wherein the display driver integrated circuit includes:
a timing controller configured to receive image data to be displayed through the plurality of pixels of the display panel; and
a data driver including a first group of latches, a second group of latches, a group of source amplifiers and a group of switches between the group of source amplifiers and the plurality of pixels of the display panel;
wherein the data driver is configured to in a first H-sync time range:
control the group of switches to close such that the group of source amplifiers connect the plurality of pixels,
control the group of source amplifiers to provide first image data corresponding to a first horizontal line to the plurality of pixels,
control the group of switches to open after providing the first image data corresponding to the first horizontal line,
while the group of switches are open, provide a part of second image data corresponding to a second horizontal line to the group of source amplifiers by operating the second group of latches,
wherein the data driver is configured to in a second H-sync time range:
control the group of switches to close to provide the part of the second image data corresponding to the second horizontal line to the plurality of pixels, and
while providing the part of the second image data corresponding to the second horizontal line to the plurality of pixels, provide rest of the second image data corresponding to the second horizontal line to the group of source amplifiers by operating the second group of latches.

14. The display of claim 13,
wherein the timing controller is configured to:
adjust a timing in which the data voltage is output, by opening and/or closing the group of switches.

15. The display of claim 13, wherein the data driver further includes a gamma circuit configured to generate a gray scale voltage applied to a group of converters, and
wherein the group of converters is configured to convert the second image data to the data voltage based on the gray scale voltage.

16. An electronic device comprising:
a display panel including a plurality of pixel lines, wherein at least one pixel line among the plurality of pixel lines includes a first pixel group connected to a first transmission line and a second pixel group connected to a second transmission line; and
a display driver integrated circuit, wherein the display driver integrated circuit includes:
a storage circuit comprising a first storage circuit and a second storage circuit configured to at least temporarily store display data to be displayed through the at least one pixel line;
at least one first source amplifier connected to the first pixel group and at least one second source amplifier connected to the second pixel group;
a first decoder connected to the first source amplifier and a second decoder connected to the second source amplifier;
at least one first switch configured to control a connection between the first source amplifier and the first pixel group and at least one second switch configured to control a connection between the second source amplifier and the second pixel group; and
a processor, wherein the processor is configured to:
supply a plurality of signals corresponding to a first portion of the display data to the first pixel group using the first switch at a first point in time; and
supply a plurality of signals corresponding to a second portion of the display data to the second pixel group using the second switch at a second point in time,
wherein the first storage circuit is configured to store the first portion of the display data and the second storage circuit is configured to transmit at least part of the first portion stored in the second storage circuit to the first decoder, while the first storage circuit stores the first portion of the display data.

17. The electronic device of claim 16, wherein the display driver integrated circuit further includes:
a gamma generating circuit configured to provide a gamma voltage associated with the display data to the first decoder and the second decoder.

18. The electronic device of claim 16, wherein the first storage circuit is configured to store the second portion of the display data, and
wherein the second storage circuit is configured to transmit at least part of the stored second portion to the second decoder, while the first storage circuit stores the second portion of the display data.

19. The electronic device of claim 16, further comprising:
an application processor configured to generate the display data,
wherein the display driver integrated circuit further includes a timing controller configured to receive the display data from the application processor.

* * * * *